United States Patent
Liu et al.

(10) Patent No.: US 10,126,780 B2
(45) Date of Patent: Nov. 13, 2018

(54) SLOT ANTENNA FOR A WEARABLE DEVICE

(71) Applicant: Huawei Technologies Co., Ltd., Shenzhen, Guangdong (CN)

(72) Inventors: Qing Liu, Shenzhen (CN); Shuhui Sun, Shenzhen (CN); Aimeng Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/547,354

(22) PCT Filed: Jan. 29, 2015

(86) PCT No.: PCT/CN2015/071834
§ 371 (c)(1),
(2) Date: Jul. 28, 2017

(87) PCT Pub. No.: WO2016/119172
PCT Pub. Date: Aug. 4, 2016

(65) Prior Publication Data
US 2018/0004247 A1    Jan. 4, 2018

(51) Int. Cl.
*G06F 1/16* (2006.01)
*H01Q 13/18* (2006.01)

(52) U.S. Cl.
CPC ............ *G06F 1/163* (2013.01); *H01Q 13/18* (2013.01)

(58) Field of Classification Search
CPC ...................................... G06F 1/163
See application file for complete search history.

(56) References Cited

U.S. PATENT DOCUMENTS

| | | | | |
|---|---|---|---|---|
| 6,288,685 B1* | 9/2001 | Thomas | ............ | H01Q 13/10 343/769 |
| 9,601,824 B2* | 3/2017 | Apaydin | ............ | H01Q 5/328 |
| 2007/0080881 A1* | 4/2007 | Thudor | ............ | H01Q 13/106 343/767 |
| 2010/0007564 A1* | 1/2010 | Hill | ............ | H01Q 1/243 343/702 |
| 2012/0120772 A1 | 5/2012 | Fujisawa | | |
| 2012/0280876 A1* | 11/2012 | Qu | ............ | H01Q 1/243 343/767 |
| 2014/0266920 A1 | 9/2014 | Tran et al. | | |

(Continued)

FOREIGN PATENT DOCUMENTS

| CN | 2722450 Y | 8/2005 |
|---|---|---|
| CN | 101800361 A | 8/2010 |

(Continued)

*Primary Examiner* — Anthony Q Edwards

(57) ABSTRACT

A wearable device includes: a metal middle cover, a metal bottom cover, a printed circuit board PCB, and a gap. The metal middle cover encircles the wearable device for a whole circle and serves as an exterior of the wearable device. The metal bottom cover is located under the metal middle cover and serves as a rear cover of the wearable device. The gap with a preset width exists between the metal middle cover and the metal bottom cover, and serves as a slot antenna of the wearable device. The PCB is in an inner side of the metal middle cover, and is located above the metal bottom cover. The PCB is electrically connected to the metal middle cover by using a feed point, and feeds power to the metal middle cover.

7 Claims, 4 Drawing Sheets

(56) References Cited

U.S. PATENT DOCUMENTS

2014/0354494 A1* 12/2014 Katz .................... H01Q 1/273
          343/718
2016/0006110 A1* 1/2016 Jain .................... H01Q 5/328
          343/702

FOREIGN PATENT DOCUMENTS

| CN | 203134962 U | 8/2013 |
| CN | 103474748 A | 12/2013 |
| CN | 103488076 A | 1/2014 |
| CN | 103531911 A | 1/2014 |
| GB | 2431522 A | 4/2007 |

* cited by examiner

SLOT ANTENNA FOR A WEARABLE DEVICE

CROSS-REFERENCE TO RELATED APPLICATIONS

This application is a national stage of International Application No. PCT/CN2015/071834, filed on Jan. 29, 2015, which is hereby incorporated by reference in its entirety.

TECHNICAL FIELD

The present invention relates to the communications field, and in particular, to a wearable device.

BACKGROUND

Because of better meeting communication requirements of people, wearable devices become increasing popular with people, and a smart watch is a most commonly used wearable device. Currently, all large communications equipment providers issue their respective smart watches, and competition in this field is intense.

Compared with a common watch, a smart watch is integrated with a communication function, and requires a built-in antenna to transmit or receive an electromagnetic signal. Currently, an antenna form such as a monopole or an IFA is generally used, and an antenna is arranged around a printed circuit board (Printed Circuit Board, PCB). To keep good transmit efficiency, an antenna requires headroom, and an arranged antenna has a height relative to the PCB.

However, headroom required by an antenna increases a size of a wearable device (such as a smart watch), and is not conducive to miniaturization of the wearable device. In addition, when an antenna such as a monopole or an IFA approaches a human body, electromagnetic waves transmitted by the antenna are mostly absorbed by the human body, which greatly deteriorates performance of the antenna and is harmful to health of the human body.

SUMMARY

Embodiments of the present invention provide a wearable device that is used to improve performance of an antenna, reduce a size of a wearable device, and reduce radiation of a wearable device to a human body.

A first aspect of the embodiments of the present invention provides a wearable device, including:

a metal middle cover, a metal bottom cover, a printed circuit board PCB, a gap, a feed point, and a ground point; where the metal middle cover encircles the wearable device for a whole circle and serves as an exterior of the wearable device;

the metal bottom cover is located under the metal middle cover and serves as a rear cover of the wearable device;

the gap with a preset width exists between the metal middle cover and the metal bottom cover, and serves as a slot antenna of the wearable device;

the PCB is in an inner side of the metal middle cover, and is located above the metal bottom cover; and the PCB is electrically connected to the metal middle cover by using the feed point, and feeds power to the metal middle cover.

With reference to the first aspect of the embodiments of the present invention, in a first implementation manner of the first aspect of the embodiments of the present invention, the metal middle cover and the metal bottom cover are electrically connected in the gap by using the ground point, and a distance, along the metal middle cover, between the ground point and the feed point is ¼ of a wavelength corresponding to a resonance frequency of the slot antenna.

With reference to the first implementation manner of the first aspect of the embodiments of the present invention, in a second implementation manner of the first aspect of the embodiments of the present invention, a quantity of the ground point is one.

With reference to the first implementation manner of the first aspect of the embodiments of the present invention, in a third implementation manner of the first aspect of the embodiments of the present invention, a quantity of the ground point is two.

With reference to the first implementation manner of the first aspect of the embodiments of the present invention, in a fourth implementation manner of the first aspect of the embodiments of the present invention, a quantity of the ground point is more than two.

With reference to the first aspect of the embodiments of the present invention, in a fifth implementation manner of the first aspect of the embodiments of the present invention, the metal middle cover and the metal bottom cover are not electrically connected, and the slot antenna operates in a ½ wavelength mode.

With reference to the first aspect of the embodiments of the present invention, in a sixth implementation manner of the first aspect of the embodiments of the present invention, the preset width is 0.3 millimeter.

With reference to the first aspect of the embodiments of the present invention, in a seventh implementation manner of the first aspect of the embodiments of the present invention, the preset width is 0.5 millimeter.

With reference to any one of the first aspect of the embodiments of the present invention, or the first to the seventh implementation manners of the first aspect, in an eight implementation manner of the first aspect of the embodiments of the present invention, the wearable device further includes:

a capacitor; where the PCB is electrically connected to the metal middle cover by using the feed point, and feeds power to the metal middle cover, which specifically includes:

two ends of the capacitor are electrically connected to the PCB and the feed point respectively, and the PCB feeds power to the metal middle cover by using the capacitor and the feed point.

It may be learned from the foregoing technical solutions that the embodiments of the present invention have the following advantages: In the embodiments of the present invention, a gap between a metal middle cover and a metal bottom cover forms a slot antenna. On the one hand, an antenna form such as a monopole or an IFA does not need to be used, and headroom processing does not need to be performed, which greatly reduces a size of a wearable device. The metal bottom cover that forms, together with the metal middle cover, the gap may prevent an electromagnetic wave radiating from space to an arm of a human body, which greatly reduces radiation of the wearable device to the human body, at the same time effectively reduces an electromagnetic wave absorbed by the human body, and improves radio performance of the wearable device. On the other hand, the slot antenna may enable currents of an antenna to be gathered at the gap, so that distribution of the currents does not change because of being affected by an arm of a human body, and radio performance of the wearable device is effectively improved.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
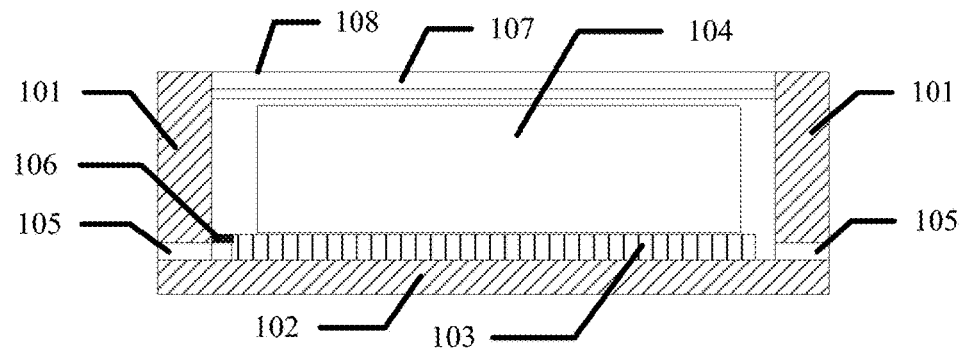
FIG. 1 is a schematic side section diagram of a wearable device according to an embodiment of the present invention.

Refer to FIG. 1, FIG. 1 is a schematic side section diagram of a wearable device according to an embodiment of the present invention. The wearable device provided in this embodiment of the present invention includes:

a metal middle cover 101, a metal bottom cover 102, a printed circuit board (Printed Circuit Board, PCB) 103, and a battery 104.

The metal middle cover 101 encircles the wearable device for a whole circle and serves as an exterior of the wearable device.

The metal bottom cover 102 is located under the metal middle cover 101 and serves as a rear cover of the wearable device.

It may be understood that the metal bottom cover 102 is a part that comes into contact with a human body when the wearable device is worn on the human body.

A gap 105 with a preset width exists between the metal middle cover 101 and the metal bottom cover 102.

The PCB 103 is in an inner side of the metal middle cover 101, and is located above the metal bottom cover 102.

The PCB 103 is electrically connected to the metal middle cover 101 by using a feed point 106, and feeds power to the metal middle cover, so that the gap 105 forms a slot antenna.

It may be understood that the PCB 103 not only includes the circuit board, but also includes a component installed on the circuit board.

The battery 104 supplies power to the PCB 103. The battery 104 may be located above the PCB 103, or may be located under the PCB 103, which is not limited herein.

A liquid crystal display (Liquid Crystal Display, LCD) 107 is installed on an upper surface of the metal middle cover 101, and the liquid crystal display may further be covered by a touch panel (TouchPanel, TP) 108.

It should be noted that the preset width is specifically determined according to a size of the wearable device when the wearable device is produced, so that the gap 105 can form a width value of a slot antenna, such as 0.5 millimeter or 0.3 millimeter. It may be understood that herein is only an example of a width of the gap 105, and any width that enables the gap 105 to form a slot antenna is acceptable, which is not limited herein. Specifically, the preset width is far less than a wavelength corresponding to a resonance frequency of the slot antenna.

It may be understood that the wearable device may be a smart watch, may be a hand ring or the like, or may be another wearable device, which is not limited herein.

In this embodiment of the present invention, a gap 105 between a metal middle cover 101 and a metal bottom cover 102 forms a slot antenna. On the one hand, an antenna form such as a monopole or an IFA does not need to be used, and headroom processing does not need to be performed, which greatly reduces a size of a wearable device. The metal bottom cover 102 that forms, together with the metal middle cover 101, the gap 105 may prevent an electromagnetic wave radiating from space to an arm of a human body, which greatly reduces radiation of the wearable device to the human body, and at the same time, effectively reduces an electromagnetic wave absorbed by the human body, and improves radio performance of the wearable device. On the other hand, the slot antenna may enable currents of an antenna to be gathered at the gap 105, so that distribution of the currents does not change because of being affected by an arm of a human body, and radio performance of the wearable device is effectively improved.

It may be understood that the wearable device in this embodiment of the present invention may be in a circular form, or may be in other various regular or irregular shapes, which is not limited herein.

In a practical application, the foregoing metal middle cover 101 and the metal bottom cover 102 may be electrically connected by using a ground point, or may not be electrically connected.

As shown in FIG. 1, as another embodiment of a wearable device in an embodiment of the present invention, in the foregoing embodiment, the metal middle cover 101 and the metal bottom cover 102 are not electrically connected in the gap 105. The slot antenna formed by the gap 105 operates in a ½ wavelength mode, where the ½ wavelength mode indicates that an electrical length of a feeding channel is ½ of a wavelength corresponding to a resonance frequency of the slot antenna.

Figure 2:
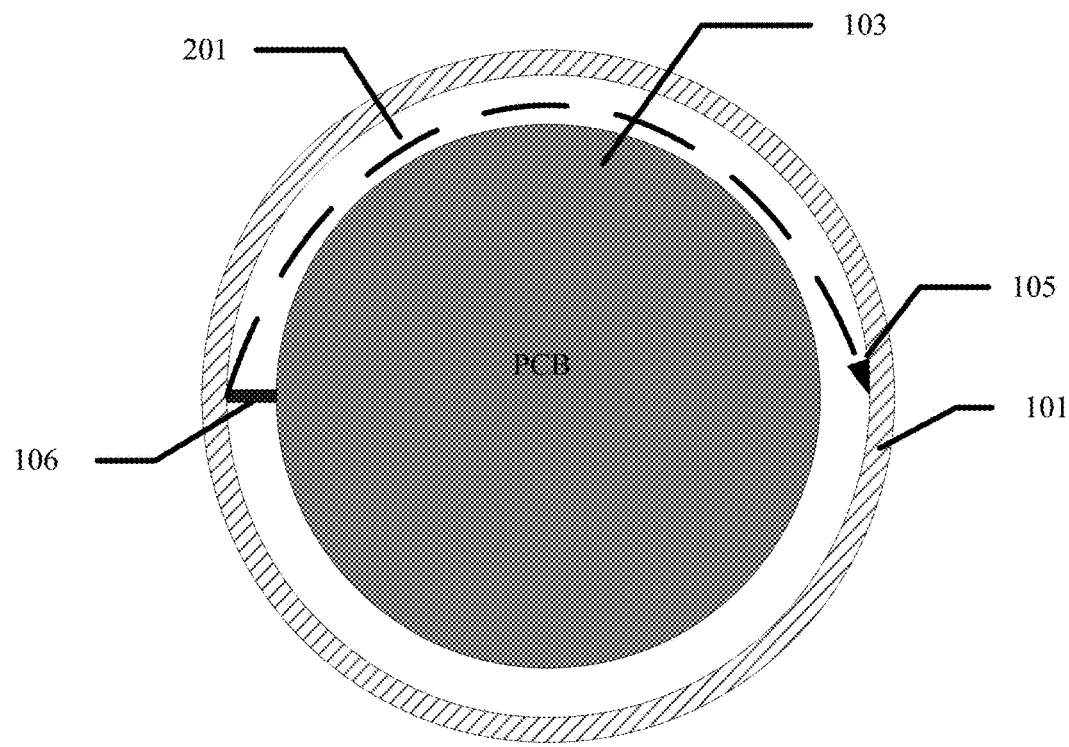
FIG. 2 is a schematic top view of a wearable device according to an embodiment of the present invention.

Specifically, FIG. 2 shows a schematic top view of a wearable device in this embodiment. A feeding channel 201 is a feeding channel of a slot antenna of a wearable device in this embodiment. An electrical length of the feeding channel 201 is a length from a feed point 106 to a symmetry point of the feed point 106 on a metal middle cover 101 and is ½ of a wavelength corresponding to a resonance frequency of the slot antenna. That is, the wavelength corresponding to the resonance frequency of the slot antenna equals a circumference of the metal middle cover 101. Therefore, in this embodiment, the circumference of the metal middle cover 101 needs to be determined according to the resonance frequency of the slot antenna when the wearable device is produced.

Figure 3:
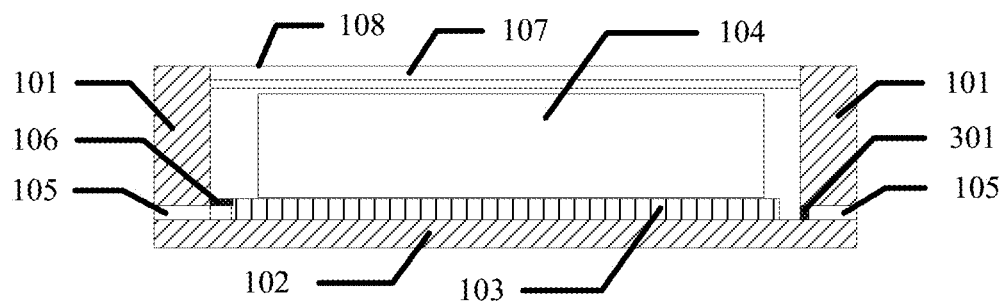
FIG. 3 is another schematic side section diagram of a wearable device according to an embodiment of the present invention.

Referring to FIG. 3, as another embodiment of a wearable device in an embodiment of the present invention, the metal middle cover 101 and the metal bottom cover 102 are electrically connected in the gap 105 by using a ground point 301.

It should be noted that the ground point 301 and the feed point 106 are not at a same location.

In the foregoing embodiment, the metal middle cover 101 and the metal bottom cover 102 are electrically connected in the gap 105 by using the ground point 301. In a practical application, a quantity of the ground point 301 is not limited.

Figure 4:
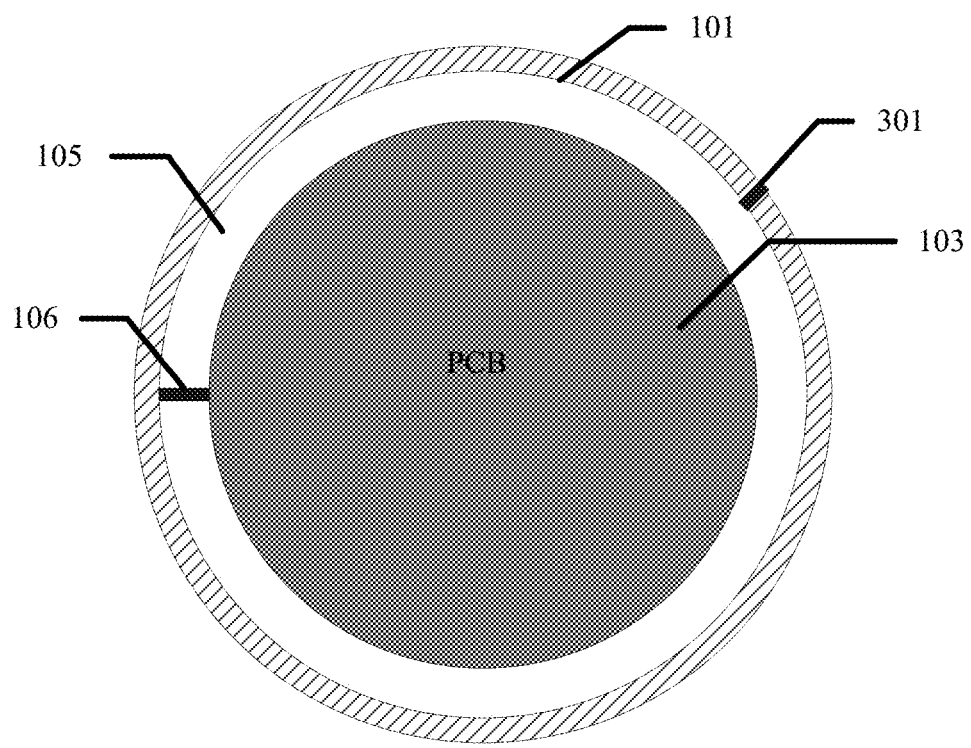
FIG. 4 is another schematic top view of a wearable device according to an embodiment of the present invention.

FIG. 4 shows a schematic top view of a wearable device according to an embodiment of the present invention. As another embodiment of a wearable device in an embodiment of the present invention, in the foregoing wearable device, the quantity of the ground point 301 may be one.

It should be noted that the ground point 301 connects a metal middle cover 101 and a metal bottom cover 102, and after a PCB 103 feeds power to the metal middle cover 101 by using a feed point 106, a current flows through the metal middle cover 101 to the ground point 301. In different wearable devices, locations of ground points 301 relative to feed points 106 may be different. A change of a distance between the feed point 106 and the ground point 301 may change an electrical length of a slot antenna, so that a resonance frequency of the slot antenna formed by the gap 105 can be coordinated. Specifically, a distance, along the metal middle cover 101, between the ground point 301 and the feed point 106 is ¼ of a wavelength corresponding to the resonance frequency of the slot antenna. That is, after the resonance frequency of the slot antenna is determined, a relative location between the feed point 106 and the ground point 301 may be determined.

In this embodiment, when there is only one ground point 301, one feeding channel is formed between the feed point 106 and the ground point 301, and the slot antenna formed by the gap 105 may implement single-frequency resonance.

Figure 5:
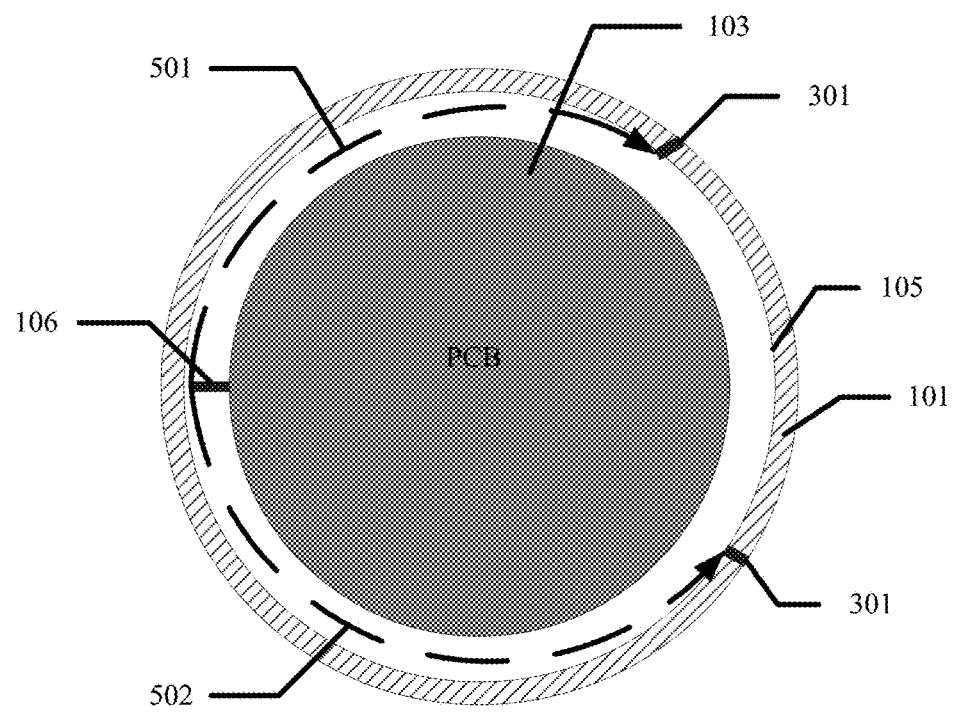
FIG. 5 is another schematic top view of a wearable device according to an embodiment of the present invention.

FIG. 5 shows another schematic top view of a wearable device according to an embodiment of the present invention. As another embodiment of a wearable device in an embodiment of the present invention, in the foregoing wearable device, the quantity of the ground point 301 may be two. It can be seen that, when the quantity of the ground point 301 is two, two feeding channels 501 and 502 shown in the figure may be formed between the feed point 106 and the ground points 301, so that a slot antenna formed by a gap 105 can generate dual frequency resonance.

It may be understood that on a basis of the foregoing wearable device, the quantity of the ground point 301 may also be more than two; however, only increasing the quantity of the ground point does not increase a quantity of a feeding channel between the feed point 106 and the ground point 301, and an effect that resonance of more than two frequencies is generated is not achieved.

Figure 6:
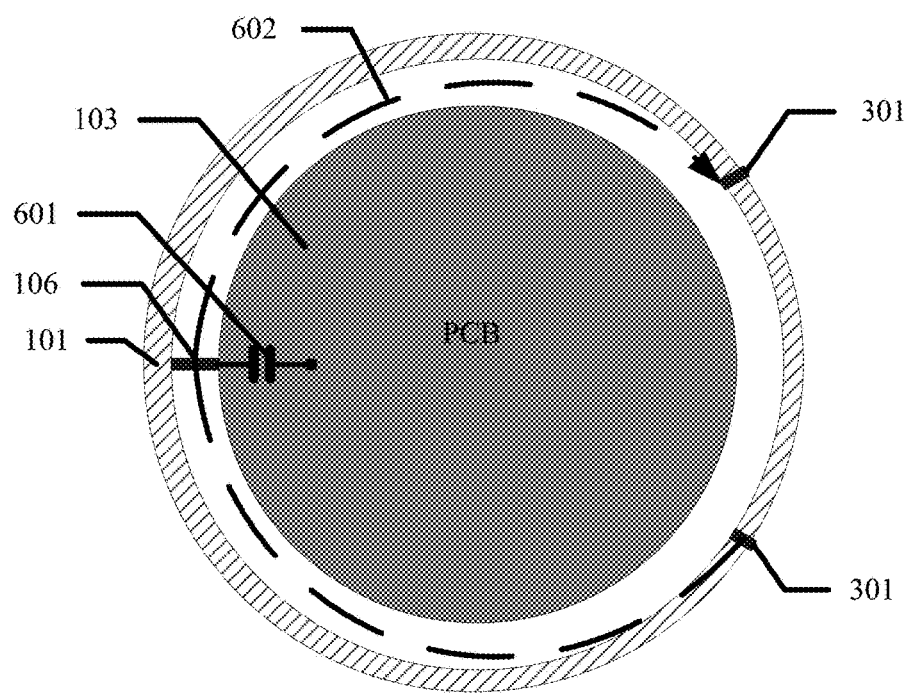
FIG. 6 is another schematic top view of a wearable device according to an embodiment of the present invention.

FIG. 6 shows another schematic top view of a wearable device according to an embodiment of the present invention. As another embodiment of a wearable device in an embodiment of the present invention, in the foregoing wearable device, a capacitor 601 may further be added between the feed point 106 and the PCB 103, the PCB 103 and the capacitor 401 are electrically connected, and the capacitor 401 and the feed point 106 are electrically connected. After the capacitor is added, a new feeding channel is formed on a basis of an existing feeding channel. As shown in FIG. 6, a feeding channel 602 from a ground point 301 to another ground point 301 is formed, so that a slot antenna formed by a gap 105 can generate a tri-band resonance. A resonance frequency of the feeding channel 402 is related to a relative location between the two ground points 301.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A wearable device, comprising:
    a metal middle cover encircling the wearable device for a whole circle and serving as an exterior of the wearable device;
    a display installed on an upper surface of the metal middle cover;
    a touch panel covering the display;
    a metal bottom cover located under the metal middle cover and serving as a rear cover of the wearable device;
    a gap having a preset width and disposed between the metal middle cover and the metal bottom cover and serving as a slot antenna for the wearable device, wherein the metal middle cover and the metal bottom cover are electrically connected within the gap via a ground point, and a distance along the metal middle cover between the ground point and the feed point is ¼ of a wavelength corresponding to a resonance frequency of the slot antenna;
    a printed circuit board (PCB) disposed in an inner side of the metal middle cover, located above the metal bottom cover, and electrically connected to the metal middle cover via a feed point for feeding power to the metal middle cover.

2. The wearable device according to claim 1, wherein a quantity of the ground point is one.

3. The wearable device according to claim 1, wherein a quantity of the ground point is two.

4. The wearable device according to claim 1, wherein a quantity of the ground point is more than two.

5. The wearable device according to claim 1, wherein the preset width is 0.3 millimeter.

6. The wearable device according to claim 1, wherein the preset width is 0.5 millimeter.

7. The wearable device according to claim 1, further comprising:
    a capacitor having a first end electrically connected to the PCB and a second end electrically connected to the feed point, the capacitor and feed point configured to feed power to the metal middle cover.

* * * * *